US010777343B2

(12) United States Patent
Timonen et al.

(10) Patent No.: US 10,777,343 B2
(45) Date of Patent: *Sep. 15, 2020

(54) MAGNETIC FLUID

(71) Applicant: Ioniqa Technologies B.V., Eindhoven (NL)

(72) Inventors: Jaakko Timonen, Eindhoven (NL); Tonnis Hooghoudt, Eindhoven (NL); Marcel Vilaplana Artigas, Eindhoven (NL); Albert Philipse, Eindhoven (NL); Carlos Guerrero Sanchez, Eindhoven (NL); Josep Casamada Ribot, Eindhoven (NL); Vincent Philippi, Eindhoven (NL); Rick De Groot, Eindhoven (NL)

(73) Assignee: Ioniqa Technologies B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,731

(22) Filed: Jan. 18, 2019

(65) Prior Publication Data

US 2019/0259518 A1    Aug. 22, 2019

Related U.S. Application Data

(63) Continuation of application No. 14/852,097, filed on Nov. 20, 2015, now Pat. No. 10,340,067, which is a continuation of application No. PCT/NL2014/050149, filed on Mar. 12, 2014.

(30) Foreign Application Priority Data

Mar. 12, 2013   (NL) .................................... 2010439

(51) Int. Cl.
*H01F 1/44*   (2006.01)
*B01J 13/00*  (2006.01)
*C02F 1/48*   (2006.01)

(52) U.S. Cl.
CPC .......... *H01F 1/447* (2013.01); *B01J 13/0034* (2013.01); *B01J 13/0047* (2013.01); *C02F 1/48* (2013.01); *H01F 1/445* (2013.01)

(58) Field of Classification Search
CPC ...... B01J 13/0034; B01J 13/0047; C02F 1/48; H01F 1/445; H01F 1/447
See application file for complete search history.

(56) References Cited

U.S. PATENT DOCUMENTS

| | | |
|---|---|---|
| 4,604,222 A | 8/1986 | Borduz et al. |
| 5,082,581 A | 1/1992 | Yabe et al. |
| 6,982,501 B1 | 1/2006 | Kotha et al. |

FOREIGN PATENT DOCUMENTS

| | | |
|---|---|---|
| CN | 101388270 A | 3/2009 |
| CN | 101648083 A | 2/2010 |
| CN | 101735061 A | 6/2010 |
| DE | 10205332 A1 | 8/2003 |

OTHER PUBLICATIONS

Wang et al, (Fe-containing magnetic ionic liquid as an effective catalyst for the glycolysis of poly( ethylene terephthalate), Catalysis Communications 11 763-767 published 2010) (Year: 2010).*
Zhang et al., (Basic ionic liquids supported on hydroxyapatite-encapsulated -Fe2O3 nanocrystallites: An efficient magnetic and recyclable heterogeneous catalyst for aqueous Knoevenagel condensation, Journal of Molecular Catalysis A: Chemical 306 107-112 published 2009) (Year: 2009).*
Zhang et al. (supporting information) (Year: 2009).*
Search Report from the European Patent Office dated Jun. 15, 2017, for European Patent Application No. 17159721 (5 pages total).
International Search Report by the International Search Authority for International App. No. PCT/NL2014/050149, dated Sep. 9, 2014 (6 pages total).
Written Opinion by the International Search Authority for International App. No. PCT/NL2014/050149, dated Aug. 28, 2015 (8 pages total).
International Preliminary Report on Patentability for International Application No. PCT/NL2014/050149, dated Aug. 28, 2015 (5 pages total).
Database WPI Week 201051 Thomson Scientific, London, GB, An 2010-J00685, CP 002771125 dated 2017.
Liesbeth N. Donselaar, et al., Concentration-Dependant Sedimentation of Dilute Magnetic Fluids and Magnetic Silica Dispersions, Langmuir, American Chemical Society, vol. 13, No. 23, Nov. 1, 1997, pp. 6018-6025.
Chia-Lung Lin, et al., Preparation and Properties of Poly(acrylic acid) Oligomer Stabilized Superparamagnetic Ferrofluid, Journal of Colloid & Interface Science, Academic Press, New York, NY, vol. 291. No. 2, Nov. 15, 2005, pp. 411-420.
Bob Luigjes, et al., Sedimentation Equilibria of Ferrofluids: II. Experimental Osmotic Equations of State of Magnetite Colloids, Journal of Physics: Condensed Matter, vol. 24, No. 24, May 23, 2012, pp. 1-7.
Albert P. Philipse, et al., Magnetic Silica Dispersions: Preparation and Stability of Surface-Modified Silica Particles with a Magnetic Core, Langmuir, American Chemical Society, New York, NY, vol. 10, No. 1, Jan. 1, 1994, pp. 92-99.

(Continued)

*Primary Examiner* — Yevgeny Valenrod
*Assistant Examiner* — Blaine G Doletski
(74) *Attorney, Agent, or Firm* — Husch Blackwell LLP

(57) ABSTRACT

The present invention is in the field of fluids and the like comprising magnetic particles, such as ferromagnetic particles, anti-ferromagnetic particles, ferrimagnetic particles, synthetic magnetic particles, paramagnetic particles, superparamagnetic particles, such as magnetic fluids, a method of stabilizing magnetic particles, use of these fluids and functionalized particles. Such fluids have a large variety of applications, such as sealants, as a sensor, in biomedics, etc. The present invention is further directed to a method of obtaining a catalyst for use in the depolymerisation of polymers into oligomers and monomer.

6 Claims, 1 Drawing Sheet

(56) References Cited

OTHER PUBLICATIONS

Ji-Hun Yu, et al., Synthesis and Properties of Magnetic Fluid Based on Iron Nanoparticles Prepared by a Vapor-Phase Condensation Process, Journal of Magnetic Magnetism and Materials Elsevier, Amsterdam, NL, vol. 304, No. 1, Sep. 1, 2006.

* cited by examiner

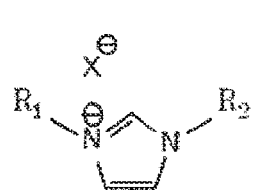 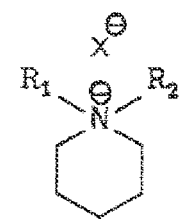 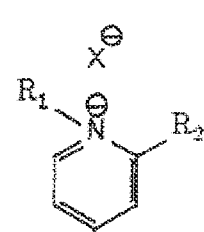
FIG. 1A    FIG. 1B    FIG. 1C
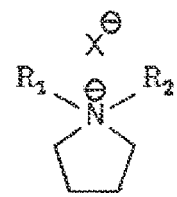 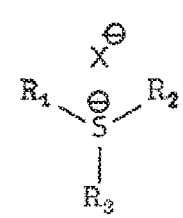 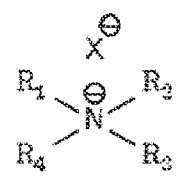
FIG. 1D    FIG. 1E    FIG. 1F
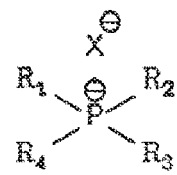 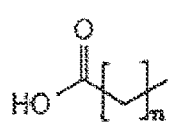 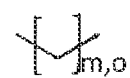
FIG. 1G    FIG. 1H    FIG. 1I

MAGNETIC FLUID

CROSS-REFERENCE TO RELATED APPLICATIONS

This application is a continuation of U.S. patent application Ser. No. 14/852,097 filed Nov. 20, 2015 which is a continuation of International Application PCT/NL2014/050149, entitled "Magnetic Fluid", to Ioniqa B.V., filed on 12 Mar. 2014, which is a continuation to Netherlands Patent Application with Serial No. 2010439, filed 12 Mar. 2013, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention is in the field of fluids and the like comprising magnetic particles, such as magnetic fluids, a method of stabilizing magnetic particles, use of these fluids and functionalized particles. Such fluids have a large variety of applications, such as sealants, as a sensor, in biomedics, etc.

DESCRIPTION OF RELATED ART

Various patent documents and scientific documents recite fluids comprising magnetic particles.

Magnetic Fluids are a class of smart materials that change their properties reversibly and fast (milliseconds) under presence of an external magnetic field. These fluids can show changes in apparent viscosity of several orders of magnitude when a magnetic field is applied, such as a magnetic flux density in the order of around 1 T. Below two sub-classes are identified.

A ferrofluid relates to a liquid which becomes strongly magnetized in the presence of a magnetic field. Typically ferrofluids are colloidal liquids made of nanoscale ferromagnetic, or ferrimagnetic, particles suspended in a carrier fluid (usually an organic solvent or water). Typically each tiny particle is thoroughly coated with a surfactant to inhibit clumping. A disadvantage is that larger particles can be removed from an otherwise homogeneous colloidal mixture, forming a separate clump of magnetic dust e.g. when exposed to strong magnetic fields.

A difference between ferrofluids and magnetorheological fluids (MR fluids) is the size of the particles. The particles in a ferrofluid primarily consist of nanoparticles which will not settle under normal conditions. MR fluid particles primarily consist of micrometer-scale particles which will settle over time because of the inherent density difference between the particle and its carrier fluid. These two fluids have very different applications as a result.

A problem with many prior art magnetic fluids is that these are not sufficiently stable, especially over time. Therefore they can not be stored for a longer period. Many prior art fluids are also not stable at higher temperatures, e.g. temperatures of application and production of the fluid, and at low vapor pressure. Even further, they are also not stable when in use, in particular in an external magnetic field (gradient).

Production methods of prior art fluids are typically time consuming (slow), not efficient, e.g. in terms of energy and chemicals used, and are laborious.

A further problem is that many fluids comprising magnetic particles can not withstand a high pressure difference, e.g. in sealing application. Also the fluids can not be used when a relative low external magnetic field (gradient) is present, as these fluids are not magnetic enough. Obtaining fluids can be complicated in view of stabilization procedures, a high temperature and inert atmosphere being required, and dialysis processing. Therewith application of the prior art fluids is limited.

It is noted that claims in various prior art documents with respect to e.g. densities obtained can not be obtained, sometimes already from a principle point.

An issue with prior art fluids is that they foam, especially when agitated. The problem is often not recognized as such, for instance because fluids are only used on a lab scale. However, clearly for large amounts of fluids to be produced foaming is an issue, e.g. in terms of controllability.

Some prior art methods form magnetic particles at relatively high $OH^-$ concentrations. In order to control e.g. particle size and particle composition a relatively high temperature of 80-95° C. needs to be used. Without such extra measures e.g. magnetite can not be obtained.

It is noted that coating nanoparticles per se is known in the prior art, e.g. for protection thereof. A coated particle does not inherently relate to particles that can be densified in a dispersion. Despite coating of magnetic particles per se is known, such does typically not relate to providing solutions to one or more of the present problems.

Incidentally some prior art recite methods which in view of the present invention could relate to forming a pre-dispersion having a low concentration of dispersed particles (at the most 5-7 vol. %). For instance DE 102 05 332 A1 recite a magnetic dispersion formed under argon atmosphere. Also Yu J-H et al. (J. Magnetism ad Magnetic Materials, vol. 304, September 2006, pp. e16-e18) recites an water based dispersion formed under an inert atmosphere, with an oleic acid coating which is considered unsuitable. Also Lin et al. (J. Coll. And Interface Science, Vol. 291, November 2005, pp. 411-420), recites a dispersion formed under an inert atmosphere, with a polyacrylic acid (PAA) coating having a high molecular weight and long polymeric chains which is considered unsuitable. None of these documents recites a high density dispersion. In fact the dispersions formed are considered unsuitable for high density dispersions.

The present invention therefore relates to a magnetic fluid, a method of stabilizing magneticparticles and use magnetic fluids, which overcomes one or more of the above disadvantages, without jeopardizing functionality and advantages.

BRIEF SUMMARY OF THE INVENTION

The present invention relates in a first aspect to a method for forming a high density dispersion, a high density dispersion, use of a high density dispersion, and a fluid comprising a high density dispersion.

The density of the dispersion can be defined in terms of volume of the magnetic particles, with respect to a total volume of a dispersion, i.e. including solvent, additives, etc., and in a similar fashion in terms of weight.

The present magnetic particles are present as very small particles, typically having a diameter of less than 10 pm. The particles therefore relate to micro-particles, and more typically to nano-particles.

The present magnetic fluids are very stable with concentrations high enough to observe a spike when placed on a magnet. It is noted that a long-term stability of the present fluid on a magnet or in a magnetic field gradient is not obvious at all. Very dilute fluids may survive a stability test relatively easily, but for concentrated ones it is much more difficult.

It is noted that only upon thorough scientific investigations the present inventors have identified boundary conditions, such as chemicals used, concentration of chemicals used, sequence of processing steps, required pH, and stages, that provide a solution to the problems mentioned throughout the description and that provide the present advantages, of which at least some advantages are considered rather unexpected. As a multitude of parameters was varied it was at forehand not clear which of the parameters would contribute to the present solution and also not to what extent.

In a first stage a dispersion having a relatively low density is formed, i.e. concentration of the magnetic particles, is provided. The relatively low density may in a next stage subsequently be increased by addition of a weak organic acid, or a corresponding (well dissolving) salt, which acid interacts with the magnetic particles. The weak organic acid is provided directly after provision of the low density dispersion, i.e. without any intermittent step. Surprisingly a relatively low concentration of weak organic acid (or likewise a corresponding salt) is found to be sufficient and, in strong contrast to prior synthesis methods, no high temperature, inert atmosphere or dialysis processing is needed for the acid to interact with the magnetic particles. If a poly-acid is used, i.e. an acid comprising two or more hydrogen atoms that can be released, a relatively lower concentration can be used. The pKa of the weak acid is preferably in the order of 3 or higher. If a poly-acid is used, the $pKa_1$ is preferably in the order of 3 or higher. In other words the weak acid is at least partly dissociated at neutral or basic pH which corresponds to the reaction conditions. The interaction between the weak organic acid and the magnetic particles takes place rather quickly. For specific examples, such as for citric acid and magnetite, the interaction is largely completed in less than 10 seconds, especially upon (vigorously) stirring. It is however preferred to give the interaction more time to be completed as far as reasonably possible, such as up to 5 minutes of time in the example.

It is noted that use of a weak acid in combination with a magnetic particles is quite atypical in the field and is in various instances discouraged in the field.

During the interaction the pH is kept at a basic value, that is at an $OH^-$ concentration of more than $10^{-7}$ mole/l. A slightly basic value of the pH is found to be sufficient. If the pH is too low, i.e. 7 or lower, or too high, the interaction is not as efficient as near pH 7 or slightly above; in view of the present invention it is regarded insufficient and the present (very) high density dispersion can not be obtained.

Surprisingly the density of a dispersion comprising magnetic particles can be increased for a wide range of magnetic particles, either particles comprising only one or substantially one (chemical) element, such as iron, cobalt, manganese, etc., but also of particles having a metal ion and a counter ion, such as oxygen, boron and nitrogen. Also combinations, such as alloys, mixed particles, and the like are applicable. In view of iron being abundantly available this element is preferred, in particular magnetite (chemical formula $Fe_3O_4$) and maghemite ($Fe_2O_3$, $Y^-Fe_2O_3$). However, if e.g. higher magnetic densities are envisaged, other elements and combination can be applied as well.

A further advantage of the present method is that a size, or likewise an average size, of particles obtained is well controlled and can be obtained in a reproducible manner. Such is achieved by controlling, during synthesis of particles, a concentration of e.g. iron salts, an addition rate of the base and an amount of the base, among others.

The present method does not need a further additional step, or at least not a further complicated step, such as high temperature, inert atmosphere or dialysis processing, such as addition or removal or any manipulation with any surfactant or any anti-foaming measure. In fact surprisingly the present fluids do not foam at all.

Thereby the present invention provides a solution to one or more of the above mentioned problems.

Advantages of the present description are detailed throughout the description.

BRIEF DESCRIPTION OF THE DRAWINGS

FIG. 1 shows general chemical structures of examples of a functionalized weak organic acid according to the invention. FIG. 1A shows an imidazolium based functional acid, FIG. 1B a piperidinium based functional acid, FIG. 1C a pyridinium based functional acid, FIG. 1D a pyrrolidinium based functional acid, FIG. 1E a sulfonium based functional acid, FIG. 1F an ammonium based functional acid, and FID. 1G an phosphonium based functional acid. FIG. 1H shows functional group Ri, whereas FIG. 1I shows functional group $R_2$. Functional groups $R_3$ and $R_4$ may be selected from H, $CH_3$ and $R_1$ and $R_2$. Functional groups $R_1$-$R_4$ are selected independently and may be (partly) the same, or not. The side group having m or o carbon atoms may be branched, whereas the side group having n carbon atoms is preferably straight.

DETAILED DESCRIPTION OF THE INVENTION

The present invention relates in a first aspect to forming magnetic particles in pre-dispersion. The method may be performed in one reactor.

In an example of the present method the magnetic particles are one or more of ferromagnetic particles, antiferromagnetic particles, ferrimagnetic particles, synthetic magnetic particles, paramagnetic particles, superparamagnetic particles, such as particles comprising one or more of Fe, Co, Ni, Gd, Dy, Mn, Nd, Sm, and preferably one or more of O, B, C, N, such as iron oxide, such as ferrite, such as magnetite, and maghemite. The present magnetic particles align in an external magnetic field, especially in an external magnetic field with a gradient. The present magnetic particles also relate to particles (and domains thereof) being partially aligned.

In an example magnetic particles are (initially) present in an amount of 10-30 wt. % relative to a total weight of the dispersion, that is a relatively low weight percentage.

In an example of the present method the carboxylic acid comprises a 4-20 carbon atoms, for water based fluids 5-10 carbon atoms, more preferably 6-8 carbon atoms, for oil based fluids 12-20 carbon atoms, more preferably 15-18 carbon atoms. For hydrophilic ionic liquids (to some extent resembling water based fluids) smaller carboxylic acids are preferred (5-10 carbon atoms), and likewise for non-hydrophilic or lipophilic ionic liquids (to some extent resembling oil based fluids) larger carboxylic acids are preferred (15-18 carbon atoms).

In an example of the present method the weak acid is a functionalized acid, such as given in FIG. 1, and further identified in the description, wherein n $\in[1\text{-}10]$, preferably n$\in[2\text{-}6]$, and/or wherein m $\in[1\text{-}6]$, preferably m$\in[2\text{-}4]$, and/or wherein o (if present) $\in[1\text{-}6]$, preferably o$\in[2\text{-}4]$, and/or wherein X is selected from F, Cl, Br, I, dicyanamide, bis(trifluoromethylsulphonyl)imide, preferably Cl, and combinations thereof. In an example n=9, m=3, and X=Cl. In an example of the present method the carboxylic acid comprises 1-4 carboxylate groups, such as 2-3 carboxylate groups, such as citric acid, and a polycarboxylic acid. It is preferred to include formation of bi-layers of the weak organic acids mentioned.

Likewise well dissolvable salts of the present acids may be used, such as Na, K, and Li.

In an example of the present method the dispersion with magnetic particles is provided at a temperature between 15° C.-95° C., preferably between 20° C.-35° C., such as a 21° C.-25° C. In principle no heating is required.

In terms of consumption and interaction it is preferred to provide the weak organic acid in an amount of $10^{-4}$-0.01 Mole acid/g magnetic particle, preferably in an amount of $5*10^{-4}$-$5*10^{-3}$ Mole acid/g magnetic particle, more preferably in an amount of $8*10^{-4}$-$2*10^{-3}$ Mole acid/g magnetic particle, that is not a too low concentration, in order to obtain a largely maximized interaction between acid and particle, and not too high, in view of consumption. In view of particle size and surface area thereof, it is noted that for relatively larger particles, such as of 100 nm, relative lower concentrations may be used, i.e. at a lower boundary of the ranges given. Likewise, for relatively smaller particles, such as of 1 nm, relative higher concentrations may be used, i.e. at a higher boundary of the ranges given.

In an example of the present method interacting takes place during a period of less than 5 minutes, such as 1-4 minutes, and wherein interaction is supported by mixing. Such process times are considered to be rather small. In comparison, prior art methods typically involve time of 1-4 hours, i.e. a factor 60 (or more) longer. Such is also important in terms of energy consumption, being extremely limited in the present case.

In an example of the present method after providing the weak organic acid the dispersion is washed one to four times, preferably with an organic liquid, such as acetone, or a mixture of water and an organic liquid. Also a combination of washing steps may be used, e.g. a first steps using water, a second step using an organic liquid, etc. The organic liquid reduces a stability of the dispersion. As a consequence the particles settle and can be separated easily from e.g. a supernatant. Also organic liquid present can be evaporated easily.

In an example of the present method the particles are separated from the washing liquid by a separation method, such as by sedimentation by settling, centrifugation, and magnetic separation. An example of a magnetic separation is a use of one or more magnetic rods, making separation very effective. The magnetic rods may be entered into the dispersion, at that point optionally not being magnetic yet; then a magnetic field may be applied. The present magnetic particles are then attracted by the magnet and can be separated easily, by turning off the magnetic field applied after removing the magnetic rods from the dispersion.

In an example of the present method the method is performed in air. In other words, no extra measures have to be taken in order to carry out the present method.

In an example of the present method after washing the dispersion the dispersion is re-dispersed in a solvent, such as water, oil, ionic liquid, such as a fluid in general.

In an example of the present method the dispersion is concentrated, such as by separating the magnetic particles from a solvent, and providing a smaller amount of solvent to the separated magnetic particles.

In an example of the present method the weak organic acid is provided at a temperature between 15° C.-95° C., preferably between 20® C.-60° C., such as a 21° C.-25° C.

After obtaining a pre-dispersion the magnetic particles obtained can be re-dispersed in a suitable solvent (or carrier), such as water, oil, an ionic liquid, optionally comprising additives, and a high density dispersion is formed. The dispersion may be further concentrated, e.g. by removing surplus solvent.

In a further example the particles may contain a further layer like structure, and/or further coating. In a detailed example the present magnetic particles are provided in a first-layer with oleic acid, and in a second layer with poly isobutenyl succinic anhydride (PIBSA) and finally dispersed in an oil, e.g. a polyalphaolefin oil. Then the dispersion may be mixed with a grease.

In a second aspect the present invention relates to a high density dispersion comprising magnetic particles. A dispersion comprising a combination of the present magnetic particles is also envisaged, such as particles having a first size, e.g. from 10-20 nm, and particles having a second size, e.g. from 500-700 nm.

An advantage of the present dispersion it that it does not form a foam or foams.

A further advantage of the present dispersion is that they are stable in high external magnetic field, such as higher than 0.5 T. Experiments have shown stable dispersion up to 1.3 T. Such is considered extremely stable. A use of the present dispersions is therefore extended over a large range of technical applications, being not achievable with prior art dispersions.

The present dispersions are also very stable, e.g. over a long period of time, such as typically more than six months, and in many cases much longer than a life time of an application, such as longer than years. It is noted that many prior art dispersion are only stable for a short period of time, e.g. days or weeks or less. Further the present dispersions remain stable also in use, or likewise when used in an intermittent fashion. Also the present dispersions are not prone to oxidation or chemical degradation; as such no special precautions have to be taken e.g. in order to preserve the dispersions.

The present dispersions take less energy to make, are faster (e.g. in sealing, switching etc.), are better sealants under more extreme conditions, have a wider range of applications, etc.

In the present dispersion the magnetic particles are present in an amount >15 vol. % relative to a total volume of the dispersion, preferably between 20-50 vol. %, more preferably between 25-40 vol. %, such as between 30-35 vol. %, and/or in an amount >45 wt. % relative to a total weight of the dispersion, preferably >50 wt. %, more preferably >60 wt. %, such as >80 wt. %, and wherein a weak organic acid is present in an amount of $5*10^{-6}$-0.1 Mole acid/g magnetic particle, In an example of the present dispersion it comprises additives, such as a thickener in a concentration of 20-80 wt. % relative to the total weight of the dispersion, such as a polymer, an oligomer, such as a polysaccharide, a starch, an elastomer, silica, a grease, and combinations thereof.

Examples of further additives are quaternary ammonium compounds, quaternary ammonium sulphates, tetra-alkyl ammonium sulphate, and antioxidants, such as di-ethylhydroxyl amine. For fluids further additives considered and used are antioxidants, such as N,N-hexylmethylamine; viscosity modifiers, such as clays, such as Bentonite, silica nanoparticles, cellulose. For thickened fluids further additives considered and used are elastomers, such as silicon rubber, styrene-butadiene-styrene thermoplastic elastomer; and viscosity modifiers such as silica particles.

Stabilizers may be included into the present liquids as well. Also surfactants may be included, such as poly isobutenyl succinic anhydride, and dodecyl benzene sulphonic acid.

In an example of the present dispersion it comprises one or more of water, an polar liquid, such as oil, such as a perfluorinated oil, e.g. a polyalphaolefin oil, such as dioctyl sebacate a polar liquid, such as an alcohol, a weak acid, an aromatic, and an ionic liquid. Examples of ionic liquids are [HMIM][TBF]: 1-Hexyl-3-methylimidazolium bis(trifluoromethylsulphonyl)imide and [BMIM][DC]: butyl-3-methylimidazolium dicyanamide. The above liquids are also referred to as carrier liquids.

In hydrophilic ionic liquids, the particles as described in example 1 can be used. For hydrophobic ionic liquids the best results are obtained when the particles have interactions with ionic liquid functionalized with a carboxylic acid, an oxysilane or other group interacting group. Preferably the ionic liquid is similar to the functionalized ionic liquid.

In an example of the present dispersion the magnetic particles have an average size of 2 nm-10 μm, preferably from 3 nm-200 nm, more preferably from 5 nm-100 nm, such as 10 nm. The particle size can be controlled at least by concentrations of the iron salts, addition rate of the base and amount of the base in the coprecipitation method used in the synthesis of particles.

A specific surface area of the preferred present particles is from 6-600 $m^2$/g particle, more preferably from 20-100 $m^2$/g particle, such as from 40-60 $m^2$/g particle.

In an example of the present dispersion the magnetic particles are one or more of ferromagnetic particles, antiferromagnetic particles, ferrimagnetic particles, synthetic magnetic particles, paramagnetic, superparamagnetic, such as particles comprising one or more of Fe, Co, Ni, Gd, Dy, Mn, Nd, Sm, and preferably one or more of O, B, C, N, such as iron oxide, such as ferrite, such as magnetite, and maghemite.

In a third aspect the present invention relates to a use of a high density dispersion.

In a fourth aspect the present invention relates to an oil, ionic liquid, or water based fluid, that is having oil, ionic liquid, or water as a (primary liquid) comprising the present dispersion.

In an example the present dispersion, specifically a magnetic fluid thereof is used functionalized with at least one poly-electrolyte, each polyelectrolyte producing a number of ions, for osmosis. In a fresh-water compartment it is added to increase an osmotic pressure thereof. The pressure needed to be applied on e.g. saline water or sea water decreases. As such the process becomes much cheaper. It is preferred to add an amount of magnetic fluid such that an osmotic pressure exceeds that of a second compartment comprising saline or sea water, that is e.g. higher than 2700 kPa (27 bar). The process of osmosis continues until pressures in both compartments are substantially equal. At that moment a large amount of water will have been separated from the saline water by osmosis, without a need to apply a pressure, or at the most a low pressure. The present magnetic fluid is e.g. then separated from the fresh water obtained, such as by application of a magnetic field. The compartment may then be emptied. The magnetic fluid can be reused and the process can start again.

In the above example it is preferred to apply the present magnetic fluid in a relatively high amount or density such that at a relatively high osmotic pressure is obtained. Having a high density dispersion less dispersion is needed. A preferred osmotic pressure is from 4-6 MPa (40-60 bar).

In an example the present dispersion, specifically a magnetic fluid thereof is used as a sensor: As an example a temperature sensor using magnetic particles dispersed in a gel. If melting temperature of the dispersion is surpassed, its conductivity decreases and can be detected easily. This change on conductivity when melting temperature is reached allows using magnetic particles dispersed in a gel as a temperature sensor at different applications, such as transport of sensitive products that cannot reach temperatures above a certain limit.

In an example the present dispersion, specifically a magnetic fluid thereof is used as a sealant: As an example a dynamic sealing using a magnetic fluid. In several equipment containing a rotating axle, there are two or more different environments that need to be hermetically separated by sealing the hole through which the axle passes. This is achieved by placing a magnetic fluid in a groove in the shaft and the use of a magnetic field to keep in place the magnetic fluid and then avoid the displacement of any impurity from one environment to the other. For example, the hard disks of computers, that need to work in hermetic conditions to avoid the interaction of their internal part with any grain of powder or smoke present in the external environment.

In an example the present dispersion, specifically a magnetic fluid thereof is used as a heat transfer fluid: As an example using a magnetic fluid for cooling of micro-system based on thermomagnetic convection: a magnet acts as a pump (with no moving parts, any power or maintenance) and the magnetic fluid acts as the coolant. Cool magnetic fluid is drawn to the part that requires cooling, it warms up and becomes less magnetic and fresh cool magnetic fluid replaces it. This cycle may continue indefinitely.

In an example the present dispersion, specifically a magnetic fluid thereof is used as a damping fluid: Magnetic fluids are utilized in the fabrication of diverse applications such as brakes and high-performance shock absorbers for civil engineering (bridges and buildings), industrial and household appliances (washing machines and fitness equipment), medical appliances (prosthetic limbs) and automotive industry (cars and trucks). For instance a magnetic fluid provided with an electronic control unit for the car suspension that will automatically adjust the properties of the magnetic fluid depending on the current road conditions and driving manner to provide a highly secure and comfortable driving.

In an example the present dispersion, specifically a magnetic fluid thereof is used in magnetic separation processes: Magnetic fluids can be used for the separation of magnetic from non-magnetic materials and for the separation of materials by their density. For instance when recycling non-ferrous metals or plastics in waste or separating diamond from gangue material in the mining industry. Using a magnetic field creates a magnetic pressure distribution in the magnetic fluid that causes the magnetic fluid to act as if it has a variable density that changes with height. Magnetic materials are attracted to the regions of strongest magnetic field, whereas nonmagnetic materials are displaced to the regions of low magnetic field with matching effective density.

In an example the present dispersion, specifically a magnetic fluid thereof is used in a magnetic drug targeting application: As an example a chemical drug bounded to a magnetic fluid is injected in a cancer tumor and it is kept in the tumor by the use of a magnetic field for a specific amount of time, for example an hour. The result of this treatment is that the chemical drug has a very intense action and the amount of drug that is needed is much lower than the amount needed if it was dispersed in the entire body. When the treatment is finished, magnetic field is turned off and the drug disperses in the body, but as the amount of drug used for the treatment is really low, it has no side effects on the patient health.

In an example the present dispersion, specifically a magnetic fluid thereof is used as magnetic lubricant in lubrication processes: Magnetic fluids mixed with an additive, such as grease, can be used to improve lubrication of dynamic machine elements, such as bearings, by positioning the magnetic fluid to specific places in the machine element applying a magnetic field.

In a fifth aspect the present invention relates to a functionalized magnetic particle or magnetic dispersion according to the invention, such as functionalized with a suitable chemical group for catalyst retrieval, functionalized with an active catalyst, functionalized with a polyelectrolyte, functionalized with a polymer, and functionalized with a reactive chemical group.

Functional groups considered are e.g. a carboxylic acid and an oxysilane, such as methoxysilane or ethoxysilane. These groups can catalyze various reactions, such as depolymerization of polymers, such as poly(ethylene terephthalate) (PET). PET can be depolymerized by functionalized magnetic particles into oligomers and mainly a monomer in order to re-polymerize the latter and to re-obtain high quality PET for further use. Functionalized magnetic particles can be recovered at the end of the depolymerization process by the application of a magnetic field and be reused.

In an example magnetic dispersion are functionalized with at least one polyelectrolyte, each polyelectrolyte producing a number of ions, for osmosis process, such as process to obtain fresh water from saline water or sea water. Functionalized magnetic dispersion can be removed from the water by the application of a magnetic field and be reused.

In an example magnetic dispersion are functionalized with a block copolymer, which is made up of blocks of different polymerized monomers, for increasing stability of magnetic particles present in a dispersion for further uses of magnetic fluid thereof.

In an example magnetic dispersion mixed with an additive, such as grease, can be functionalized with a reactive chemical group to be used as reactive magnetic lubricant in certain additional applications together with improving lubrication of dynamic machine elements, such as bearings.

The invention is further detailed by the accompanying examples, which are exemplary and explanatory of nature and are not limiting the scope of the invention. To the person skilled in the art it may be clear that many variants, being obvious or not, may be conceivable falling within the scope of protection, defined by the present claims.

Examples

The invention although described in detailed explanatory context may be best understood in conjunction with the accompanying examples.

Experimental procedure to obtain water-based magnetic fluid stabilized with citric acid
List of Chemicals Used:
Iron(III)chloride $FeCl_3.6H_2O$
hexahydrate $FeCl_2.4H_2O$
Iron(II)chloride $C_6H_8O_7.1H_2O$
tetrahydrate Citric acid $NH_4OH$
monohydrate Ammonium $(CH_3)_2C_0$
hydroxide $H_2O$
Acetone
Demiwater
1 procedure
a) Synthesis of Particles (Using a Coprecipitation Method at Room Temperature):
43.25 g of $FeCls.6H_2O$, 15.9 g of $FeCl_2.4H_2O$ and surplus of demiwater were mixed. When after iron chlorides were dissolved, ammonium hydroxide was added over 15 seconds. The obtained dispersion was stirred for 5 minutes.

b) Stabilization with Citric Acid (at Room Temperature) and Washing Steps with Water and Acetone:

Thereafter, 50.43 g of citric acid were added. When the citric acid was added, the dispersion was stirred for 5 minutes, after which the beaker was placed on a Neodymium magnet for 5 minutes. The clear supernatant was decanted and separated from magnetic particles. Then, water was added to magnetic particles and stirred for 5 minutes until no more aggregates were remaining.

When no more aggregates were visible, acetone was added and was placed on the magnet for 6 minutes. The dark yellow supernatant was removed and the particles were redispersed in sufficient water by stirring it until no more aggregates were visible. Then, acetone was added to the obtained dispersion and was placed on the magnet for 5 minutes. The clear yellow supernatant formed was decanted and only particles which remained on the magnet were redispersed in water and stirred until no more aggregates were visible. After, acetone was added to the dispersion and placed on the magnet for 2 minutes. The supernatant was decanted. Finally, a small volume of water was added until the particles were redispersed and a homogeneous magnetic fluid was obtained (Small volume does not mean the minimum volume of water to redisperse the particles as it is possible to increase the concentration of particles afterwards (see section c))).

c) Increase of the Magnetic Fluid Concentration of Particles:

After obtaining the magnetic fluid, the concentration of particles can be increased until the desired value by leaving magnetic fluid in an opened vessel at room temperature overnight or at a temperature between 40 and 60° C. for several hours.

Oil-Based Magnetic Fluid Production Procedure
List of Chemicals Used:
Iron(III)chloride (40% v/v) $FeCl_3$
Iron(II)sulphate heptahydrate $FeSO_4.7H_2O$
Oleic Acid $C_{18}H_{34}O_2$
Ammonium hydroxide $NH_4OH$ Acetone $(CH_3)_2CO$
Demiwater $H_2O$
1 procedure
a) Synthesis of Particles (Using a Prior Art Coprecipitation Method at Room Temperature):
17 g FeSCg.1IHhO, 36 g of FeCls and demiwater were mixed. When after iron chloride and iron sulphate were dissolved, ammonium hydroxide was added over 15 seconds. The obtained dispersion was stirred for 5 minutes.

b) Stabilization with Oleic Acid and Washing Steps with Water and Acetone:
Thereafter, 20 g of oleic acid was added. When the oleic acid was added, the dispersion was stirred for 15 minutes. After which the beaker was placed on a Neodymium magnet for 5 minutes. The clear supernatant was decanted and separated from magnetic particles. Then, water was added to magnetic particles and stirred for 5 minutes until no more aggregates were remaining.

When no more aggregates were visible, acetone was added and was placed on the magnet for 6 minutes. The supernatant was removed and the particles were redispersed in sufficient water by stirring it until no more aggregates were visible. Then, acetone was added to the obtained dispersion and was placed on the magnet for 5 minutes. The supernatant formed was decanted and only particles which remained on the magnet were redispersed in water and stirred until no more aggregates were visible. After, acetone was added to the dispersion and placed on the magnet for 2 minutes. The supernatant was decanted. Finally, a small volume of oil-based carrier was added until the particles were redispersed and a homogeneous magnetic fluid was obtained.

In the tables 1-2 below some further details of the present dispersions are given, specifically for water and oil based ferrofluids.

TABLE 1

Volume and weight percentages of present water based ferrofluid dispersions.
Water based Ferrofluid

| V/V % obtained | wt. % obtained |
|---|---|
| 15 | 48.3 |
| 20 | 57 |
| 25 | 63.4 |
| 30 | 69.1 |
| 40 | 77.6 |

Table 1. Volume and Weight Percentages of Present Water Based Ferrofluid Dispersions.

TABLE 2

Volume and weight percentages of present oil based ferrofluid dispersions.
Oil based ferrofluids

| V/V % obtained | wt. % obtained |
|---|---|
| 15 | 50.2 |
| 20 | 58.9 |
| 25 | 65.6 |
| 30 | 71.3 |
| 40 | 79.3 |

Table 2. Volume and Weight Percentages of Present Oil Based Ferrofluid Dispersions.

It should be appreciated that for commercial application it may be preferable to use one or more variations of the present system, which would similar be to the ones disclosed in the present application and are within the spirit of the invention.

What is claimed is:

1. A method of obtaining a catalyst for use in the depolymerisation of polymers into oligomers and monomer, said catalyst being a functionalized magnetic particle that is functionalized with a ionic liquid chosen from the group of

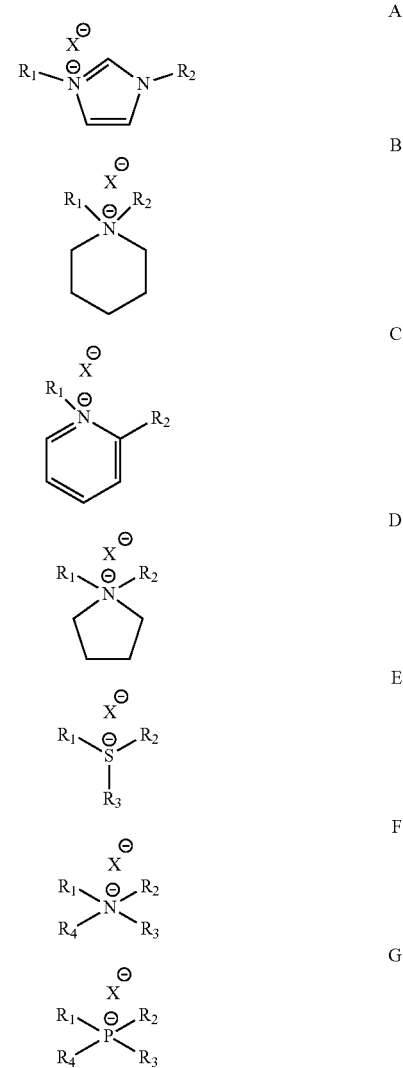

Wherein
$R_1$ is a functional group for interaction with the magnetic particle and chosen from carboxylic acid or an oxysilane;
$R_2$ is a $C_1$-$C_6$ straight alkyl chain;
$R_3$ and $R_4$ may be selected from H, $CH_3$ and $R_1$ and $R_2$;
X is selected from F, Cl, Br, I, dicyanamide, bis(trifluoromethylsulphonyl)imide,
wherein said functionalized magnetic particle is provided as a dispersion, and said dispersion is obtained by providing a ionic liquid functionalized with a functional group chosen from carboxylic acid and oxysilane, in an amount of $5*10^{-6}$ to 0.1 mole acid/q magnetic particle, and interacting the functionalized ionic liquid and the magnetic particles maintaining the pH at a basic (alkaline) value;
washing the dispersion one to four times; and
redispersing the washed dispersion in a solvent.

2. The method as claimed in claim 1, wherein R1 is

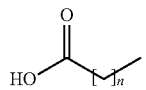

wherein n ϵ[1-10].

3. The method as claimed in claim 1, wherein the magnetic particles have an average size of 2 nm-200 nm.

4. The method as claimed in claim 1, wherein the magnetic particles comprise magnetite or maghemite.

5. The method as claimed in claim 1, wherein the magnetic particles are present in an amount >15 vol. % relative to a total volume of the dispersion, and wherein the ionic liquid is present in an amount of $5.10^{-6}$ to 0.1 mole acid/g magnetic particle on the magnetic particle.

6. The method as claimed in claim 1, wherein the polymer is polyethylene terephthalate (PET).

\* \* \* \* \*